United States Patent [19]
Klees

[11] 3,881,767
[45] May 6, 1975

[54] VEHICLE IMPACT ENERGY ABSORPTION AND SUSPENSION SYSTEM

[75] Inventor: Gerard T. Klees, Rochester, Mich.

[73] Assignee: General Motors Corporation, Detroit, Mich.

[22] Filed: Sept. 12, 1973

[21] Appl. No.: 396,391

[52] U.S. Cl......... 296/35 R; 248/358 R; 267/63 R; 293/30; 293/63
[51] Int. Cl.... B60r 19/00; B62d 23/00; F16f 16/08
[58] Field of Search. 180/90.6; 248/358 AA, 358 R, 248/48; 293/1, 30, 60, 63; 296/1 R, 35 A, 35 R; 267/63 R

[56] References Cited
UNITED STATES PATENTS

| | | | |
|---|---|---|---|
| 1,844,168 | 2/1932 | Knapp | 296/35 R |
| 2,117,264 | 5/1938 | Workman | 248/358 R |
| 2,171,947 | 9/1939 | Parker | 296/35 R |
| 2,286,582 | 6/1942 | Sherman | 296/35 R |
| 2,303,286 | 11/1942 | Lake | 296/35 A |
| 2,457,058 | 12/1948 | Markowitz | 248/358 R |
| 2,597,878 | 5/1952 | Lee | 248/358 R |
| 2,642,252 | 6/1953 | Pietz | 248/358 R |
| 2,721,616 | 10/1955 | Rocha | 180/90.6 |
| 2,831,673 | 4/1958 | Paulsen | 267/63 R |
| 3,060,538 | 10/1962 | Simi | 248/358 R |
| 3,560,041 | 2/1971 | Foster | 296/1 R |

*Primary Examiner*—M. Henson Wood, Jr.
*Assistant Examiner*—Howard Beltran
*Attorney, Agent, or Firm*—Charles R. White

[57] ABSTRACT

The vehicle body is connected to the side rails of the vehicle frame by special body mounts some of which allow longitudinal movement of the body relative to the frame and others which solidly couple the body to an end of the side rails. On impact the body moves longitudinally relative to this frame and compressively loads the side rails through predetermined body mounts. If the impact load is sufficiently high, the compressive load applied to the side rails by the body causes their resilient buckling for effective absorption of impact energy.

6 Claims, 9 Drawing Figures

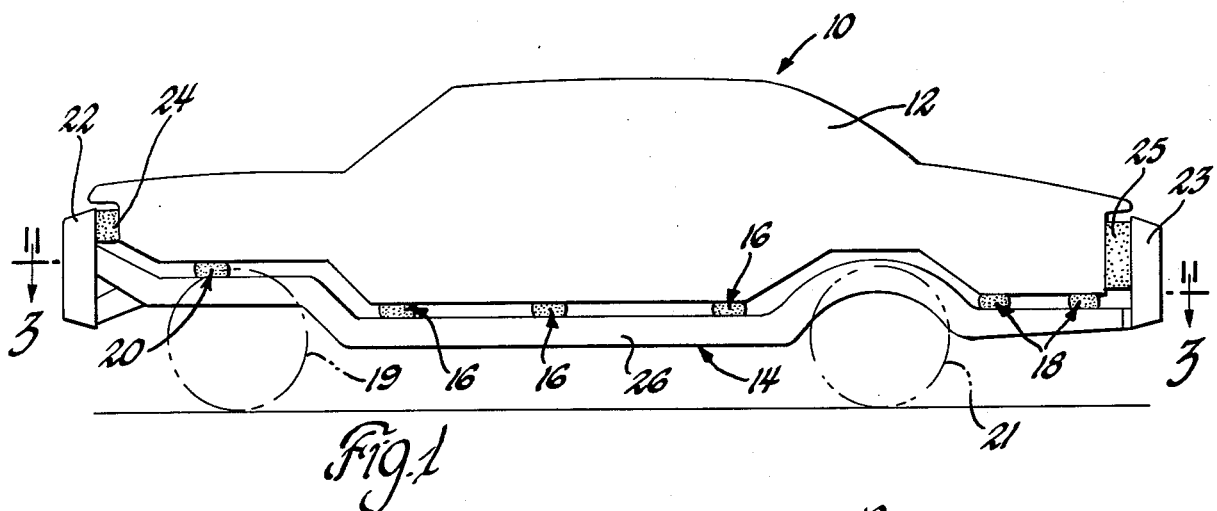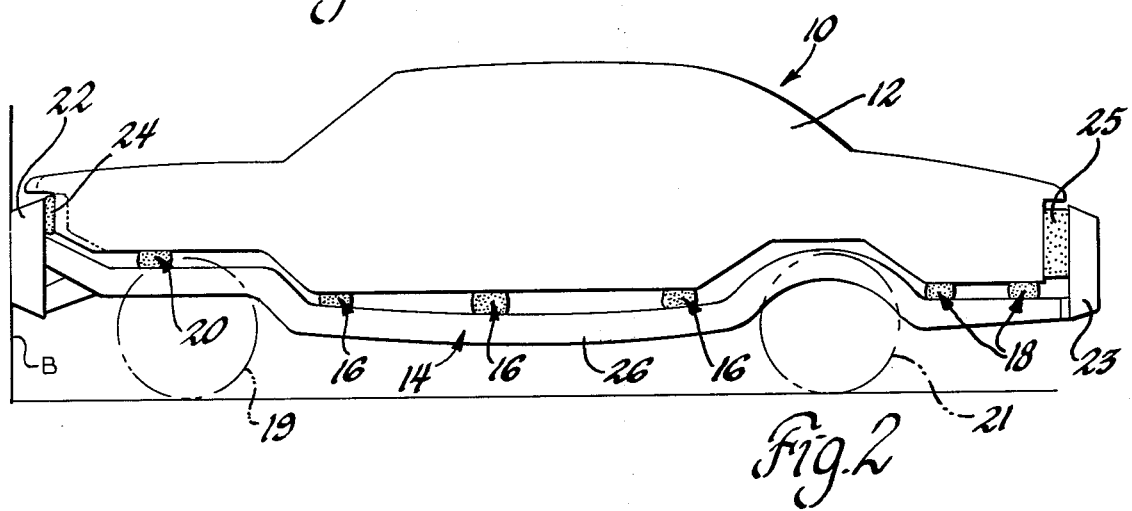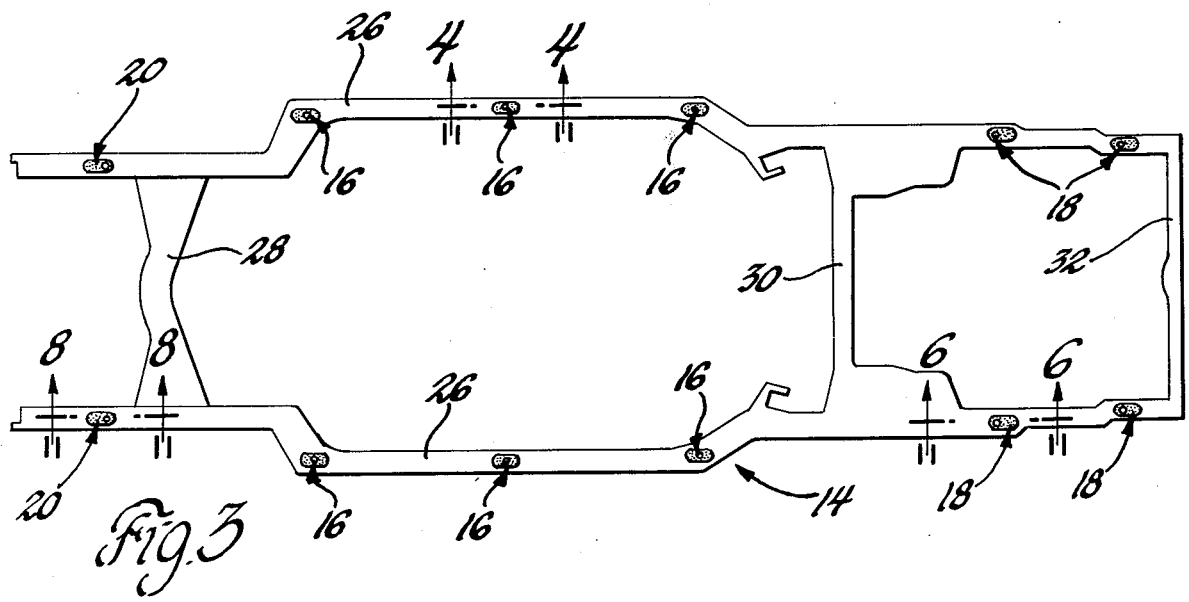

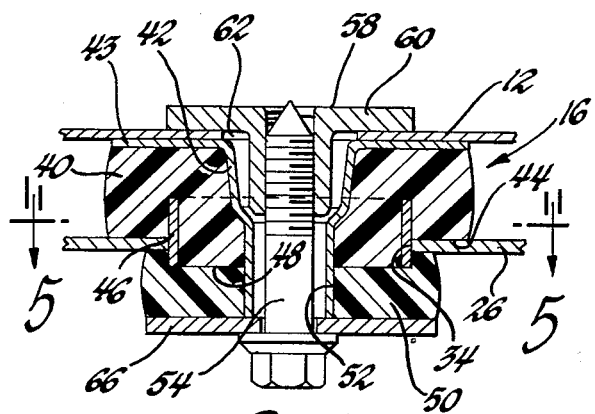
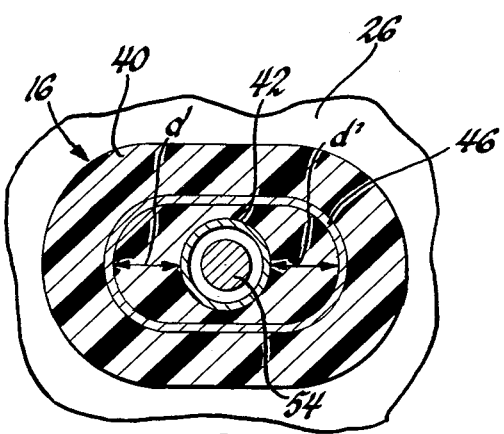
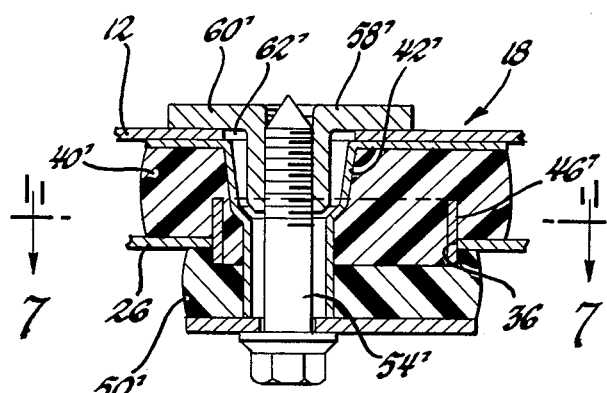
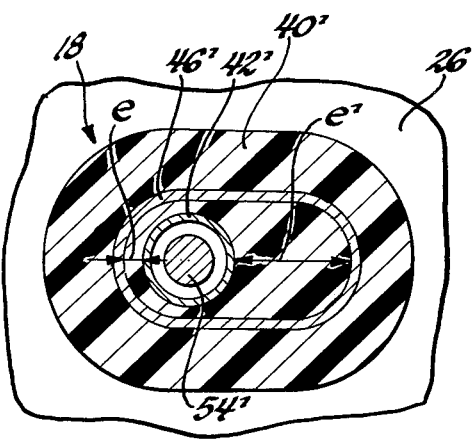
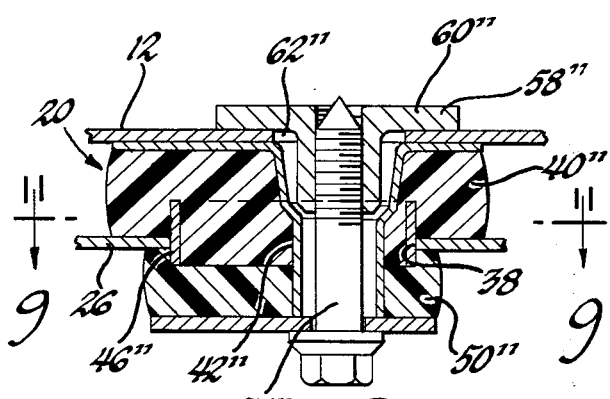
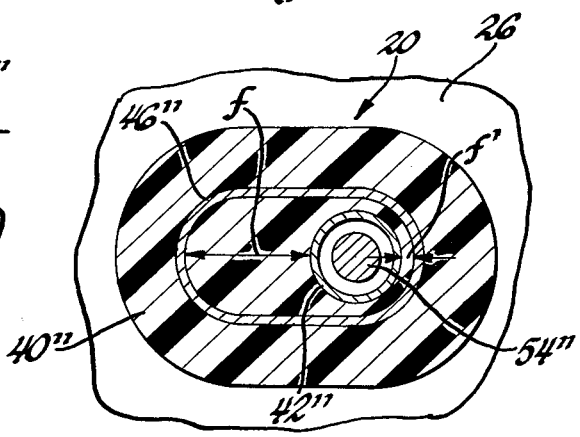

VEHICLE IMPACT ENERGY ABSORPTION AND SUSPENSION SYSTEM

This invention relates to impact energy absorption systems for vehicles and more particularly to a new and improved vehicle body mount and frame construction interconnected so that the frame acts as a buckling column on vehicle impact to absorb impact energy.

Prior to the present invention, separate pneumatic and hydraulic energy absorbing units have been interposed between large and heavy vehicle bumpers and the vehicle frame to provide a longitudinally yielding energy absorber system to dissipate impact energy. While these bumpers and connected energy absorber units have provided effective energy absorption and improved protection of the vehicle body, they have materially increased overall vehicle weight and thus have detracted from vehicle operating economy and performance. Additionally, the large force of some impacts directed higher than the centerline of many prior energy absorbing units introduced a bending moment greater than the umits were capable of managing. This caused damage or destruction of the units and necessitated their repair or replacement. Corner impacts also presented a problem with many of these prior energy absorption systems since the bumper had to tramp longitudinally for effective energy absorption.

In this invention, such prior pneumatic and hydraulic energy absorbing units have been eliminated and replaced by a unique energy absorption system involving only the bumpers, frame and body mounts. This system adds minimal weight to the vehicle and provides improved absorption of energy from impacts including overcenter and corner impacts. The bumpers are rigidly connected to the ends of the vehicle frame while the body of the vehicle is connected to the frame by new and improved body mounts that allow the elongated side rails to act as resilient buckling columns to absorb impact energy in the event that the vehicle is involved in a collision.

These body mounts tie an end portion of the body to end portions of the frame side rails so that on impact the side rails are compressively loaded at points remote from the bumper; the body moves longitudinally toward the impacted bumper as the side rails flex and absorb impact energy. Being highly elastic and if not stressed beyond their elastic limit, the rails return to their original size and shape when the deforming stress is removed.

In the preferred embodiment of this invention, the frame is a box-type structure of a suitable high strength steel and has longitudinally extending side rails connected by laterally extending front, rear and intermediate cross members. Front and rear bumper means are rigidly fastened to the ends of the frame and special body mounts are used in spaced locations to connect the vehicle body to the frame and to damp mechanical vibratory energy imparted to the frame.

On front impact, front and intermediate pairs of body mounts allow the forward longitudinal movement of the vehicle body relative to the frame while a compressive force is exerted on the ends of the frame side rails through the rear body mounts. On such front end collisions, impact energy is effectively absorbed as an elongated intermediate portion of the side rails deflects downwardly or outwardly.

Also in the preferred embodiment, the rear and intermediate pairs of body mounts provide for the longitudinal movement of the body toward the rear bumper while the front body mounts rigidly connect the body to a front portion of the side rails in response to rear end impacts. When such impacts occur, the body will move relative to the frame toward the rear bumper with the impact force transmitted through the front body mounts to cause the side rails to deflect and absorb impact energy. The side rails preferably are of a high strength elastic metal which return to their undeflected state after impact. With this invention, the energy of overcenter and corner impacts is more effectively dissipated with the structural rigidity provided between the bumper and the frame and with the side rails acting as elastic energy absorbing units when the body moves relative to the frame.

It is a feature, object and advantage of this invention to provide a new and improved impact energy absorption system for vehicles in which a portion of the vehicle frame is tied to a portion of the vehicle body and acts as a buckling column compressively loaded by the vehicle body in response to vehicle impact to absorb impact energy as the body moves longitudinally relative to the frame.

Another feature, object and advantage of this invention is to provide a new and improved impact energy absorption system for vehicles comprising a frame connected to a body by unique body mount means which allow the body to move relative to the frame on vehicle impact and exert a compressive force on the ends of elastic side rails to effect their deflection and the absorption of impact energy.

Another feature, object and advantage of this invention is to provide a new and improved energy absorbing system for vehicles incorporating pairs of fixed and longitudinally yieldable body mounts and an elastic, high-strength vehicle frame. On impact the frame is compressively loaded by the body and acts as an elastic buckling column and deflects to absorb impact energy. In this system the impact forces are exerted at a plurality of points throughout the body so that no one point becomes overstressed and fails.

These and other features, objects and advantages of this invention will become more apparent from the following detailed description and drawings in which:

FIG. 1 is a diagrammatical side view of a vehicle before front impact;

FIG. 2 is a diagrammatical side view of the vehicle of FIG. 1 after front impact;

FIG. 3 is a top view of a vehicle frame taken generally along lines 3—3 of FIG. 1;

FIG. 4 is a cross sectional view of one of the intermediate body mounts taken along lines 4—4 of FIG. 3;

FIG. 5 is a cross sectional view taken along lines 5—5 of FIG. 4;

FIG. 6 is a sectional view taken along lines 6—6 of FIG. 3 showing one of the rear body mounts;

FIG. 7 is a view taken along lines 7—7 of FIG. 6;

FIG. 8 is a view taken along lines 8—8 of FIG. 3; and

FIG. 9 is a view taken along lines 9—9 of FIG. 8.

Turning now in greater detail to the drawings illustrating a preferred embodiment of this invention, FIG. 1 diagrammatically shows a vehicle 10 having a body 12 supported on a frame 14 by intermediate body mount assemblies 16, rear body mount assemblies 18 and front body mount assemblies 20. Front and rear pairs of wheels 19 and 21 are connected to the frame by conventional suspension systems not shown. Laterally extending front and rear bumpers 22 and 23 are respectively rigidly secured to the opposite ends of frame 14. Front and rear elastomeric shock absorber cushions 24 and 25 are respectively disposed between the front of the body 12 and front bumper 22 and between the rear bumper 23 and the rear end of the vehicle body 12 to absorb impact energy as the body moves relative to the frame as will be further explained below.

FIG. 3 shows the frame 14 in its normal undeflected state as a box-type frame preferably of high strength steel having side rails 26 connected by front, intermediate and rear cross members 28, 30 and 32. The side rails 26 are formed with oval shaped openings 34, 36 and 38 into which are fitted the intermediate, rear and front body mount assemblies, respectively.

The intermediate body mount assemblies 16 are identical to each other and one of these assemblies is shown in detail in FIGS. 4 and 5 operatively connecting the body 12 of the vehicle to the side rails 26 of the frame. Each of these assemblies 16 comprises a load bearing and block-like pad 40 of an elastomer material. Preferably the pad is molded around a centrally located, tubular-metal spacer 42 having a flat exterior head 43 disposed over the top surface of the pad 40. The load supporting pad 40 further has an annular bottom support surface 44 that seats on the side rail 26 of frame 14 when the body mount assembly is installed. A centrally located oval metal collar 46, partially buried in the pad 40, extends downwardly from the bottom support surface 44 into a close fit within the opening 34 formed in the side rails 26. The material of the pad 40 further extends between the inner wall of the collar 46 and the tubular spacer 42 and has a bottom surface 48 that terminates in alignment with the lower edge of collar 46.

Disposed beneath pad 40 is an oval vibration insulator 50 of elastomeric material having a central opening 52 through which the tubular spacer 42 extends. A connecting bolt 54 is employed to operatively secure the intermediate body mount assemblies to the frame and body. As illustrated, the bolt 54 extends upwardly through the spacer tube 42 and is threaded into an anchor nut 58 which has a radially extending flange 60 that extends beyond the edge of opening 62 formed in the vehicle body. The insulator 50 is supported by a flat washer 66 disposed between the head of the bolt 54 and the lower surface of the insulator. As shown, the top of insulator 50 is shaped to fit the lower surface 48 of the pad 40 and to have peripheral contact surface with the side rails.

The metal tubular spacer limits the vertical compression of pad 40 and the insulator 50 when bolt 54 is tightened to mount the vehicle body on the frame and to limit the amount of forward or rearward longitudinal travel the body is allowed to make relative to the frame.

As shown in FIGS. 4 and 5, the tubular spacer is disposed at equal longitudinal distances $d$ and $d'$ from the inner forward and rearward wall of the collar 46. Since collar 46 is in effect a part of the side rails of the vehicle frame, the distance $d$ represents the amount of travel in a longitudinal direction forwardly that the vehicle body can move relative to the frame before the intermediate body mounts ground to provide a solid connection between these two vehicle components. The distance $d'$ represents the amount of travel in a longitudinal direction rearwardly that the vehicle body can move relative to this frame before the intermediate body mounts provide a solid connection between the body and frame. In the event the tubular spacer is crushed on front and rear impacts the connecting bolt 54 will limit the longitudinal movement of the body 12.

The rear body mount assemblies 18 are similar in construction to the intermediate body mount assemblies 16 and parts corresponding to those of the intermediate body mount assemblies are identified by the same reference numerals which have been primed. One of the rear body mount assemblies is shown in FIGS. 6 and 7 and each comprises an elastomeric pad 40' through which the metallic tubular spacer 42' extends. This spacer has a forward location in the pad closely adjacent to the forward curved wall of the collar 46' which is mounted in the side rail opening 36. The bolt 54' extends upwardly through the insulator 50' and is threaded into the anchor nut 58' which extends through opening 62' in the body. With this construction the body can move longitudinally forward relative to the frame only a short distance represented by the distance $e$ before the elastomer material is fully deflected or displaced from the forward space between spacer 42 and collar 46 and there is a solid drive connection between the body and the side rails. Since the tubular spacer 42' is located further away from the rearward end wall of the collar 46' the body can move a relatively long distance rearwardly as represented by distance $e'$ in FIG. 7 before there is a solid connection between the body and the frame.

The front body mounts 20 are identical in construction to the rear body mounts 18 but, as shown in FIGS. 8 and 9, are turned 180° to permit a longer forward travel of the body relative to the frame and a shorter rearward travel of the body relative to the frame.

Parts of the front body mount assemblies 20 corresponding to those of the intermediate and rear body mount assemblies 16 and 18 are indentified by the same reference numeral which have been double primed. As shown in FIGS. 8 and 9 each front body mount assembly comprises an elastomeric pad 40" through which tubular metal spacer 42" extends. This spacer has a rearward longitudinal location in the pad spaced several spacer diameters from the forward curved wall of the collar 46" which is mounted in the opening 38 in the side rail. The fastener bolt 54" extends upwardly through the lower insulator 50" and is threaded into the anchor nut 58" which projects downwardly through openings 62" in the body 12. With this construction the body can move longitudinally forward relative to the frame a relatively long distance represented by distance f in FIG. 9. Since the tubular spacer 42" is located closely adjacent to the rear end wall of the collar 46" the body 12 moves only a short distance rearwardly as represented by distance $f'$ before there is a solid connection between the body 12 and frame 14.

In operation, assuming that the vehicle impacts a stationary barrier B in FIG. 2, the front and intermediate body mounts will permit considerable longitudinal forward travel of the body to the frame as represented by distances $d$ and $f$ while distance $e$ of the rear body mount closes and the rearward body mount makes a solid connection anchoring the rear portion of the body to the frame. The immediate effect of this is to compressibly load the rear portions of each of the side rails which act as buckling columns. Thus, if the compressive force exerted on the side rails is sufficiently high the rails will resiliently deflect downwardly as shown in FIG. 2 so that impact energy is effectively dissipated. Since the side rails have a good force of recovery and assuming that they have not been strained beyond their elastic limits, the side rails will return to their original shape after impact to provide for absorption of the impact energy without damage to the vehicle body. On front impact cushion 24 deflects to prevent damage to the front portion of body 12 adjacent to bumper 22.

In the event of a rearward impact, the rear and intermediate body mount assemblies permit the body to move longitudinally rearwardly relative to the frame while the distance $f'$ closes and the front body mount assemblies anchor the front portion of the body to the front portion of the two side rails. Under these circumstances the side rails will again act as buckling columns and deflect to absorb impact energy without damage to the body. As the body moves rearwardly the rear cushion 25 deflects to absorb energy and prevent damage to the rear portion of body 12 adjacent to the rear bumper.

Instead of buckling vertically as diagrammatically illustrated in FIG. 2, the side rails can be readily constructed to buckle laterally if desired. With such construction the side rails would preferably bow outwardly to absorb impact energy and restore to their original shape after impact.

While a preferred embodiment of this invention has been shown and described other embodiments incorporating this invention will be now readily apparent to those skilled in the art. Therefore, the scope of this invention is set forth in the following claims.

What is claimed is:

1. An impact energy absorption system for vehicles comprising a vehicle body, frame means for said vehicle body, said frame means comprising steel side rail means extending beneath said vehicle body, said frame means having front and rear end portions, laterally extending bumper means rigidly and directly connected to said front end portion of said frame means and in front of said vehicle body, first body mount means operatively connecting a front end of said body to said front end of said frame means to permit said body to move longitudinally relative to said frame after impact of said bumper means, second body mount means operatively connecting the rear end of said body to the rear end portion of said frame means, said second body mount means having resilient vibration damping means to dissipate vibratory energy in said frame means and said body, said second body mount means further having mechanical connector means operatively connecting said body and said frame means for positively limiting the longitudinal movement of said rear end of said body relative to said frame means after impact of said bumper means to compressively load said frame means from one end thereof to thereby effect the resilient deflection of said side rail means which absorbs and stores impact energy.

2. An impact energy absorption system for a vehicle comprising a vehicle body, a vehicle frame having a pair of longitudinal side rails extending beneath the vehicle body, horizontally extending bumper means external of said vehicle body rigidly and directly connected to one end of each of said side rails, first and second pairs of body mount means for operatively connecting said side rails to the underside of said body to isolate said body from said frame, first connector means connecting said first pair of body mount means to said side rails at a first location at one end of said vehicle body to permit the longitudinal movement of said body relative to said side rails, second connector means connecting said second pairs of said body mount means to said side rails at a second location spaced from said first location and near the other end of said body so that said side rails are compressively loaded by said body on predetermined impact of said bumper means and in response to movement of said body longitudinally relative to said side rails to effect the deflection of each of said side rails so that impact energy will be absorbed and stored.

3. An impact energy absorption system for vehicles comprising a vehicle body, a vehicle frame having longitudinally extending and spaced side rails of high strength metal disposed beneath the vehicle body, laterally extending bumper means external of said vehicle body rigidly and directly connected to one end of each said side rails, body mount means operatively connecting said side rails to the underside of said body to isloate said body from the mechanical vibration of said frame, and additional body mount means operatively connecting said body to one end of said side rails, said additional body mount means having rigid fastener means extending through said vehicle body and said rail means for limiting the longitudinal movement of one end of said body relative to said frame after vehicle impact so that said side rails are compressively loaded only at said one end and deflected by impact forces exerted through said rigid fastener means so that impact energy is absorbed and stored.

4. An impact energy absorption system for vehicles comprising a vehicle body, a box-like frame having a pair of longitudinally extending resilient side rails of high strength steel operatively disposed beneath said vehicle body, first bumper means rigidly and directly connected to the front end of said side rails, second bumper means rigidly and directly connected to the rear end of said side rails, resilient energy absorption cushion means operatively mounted between said first bumper means and said vehicle body, said side rails having a first pair of openings adjacent to said front end of said side rails and a second pair of openings adjacent to the rear end of said side rails, first body mount means operatively connecting said front of said body to the front of said side rails, said first body mount means having first rigid fastener means connected to said vehicle body extending through said first pair of openings to permit the longitudinal movement of said body forwardly relative to said side rails on front end impact and to limit the longitudinal movement of said body rearwardly relative to said side rails on rear end impact, said side rails having a second pair of openings adjacent to the rear end of said side rails, second body mount means operatively connecting the rear of said body to the rear of said side rails, said second body mount means having second rigid fastener means connected to said vehicle body and extending through said second pair of openings to limit the forward movement of said body relative to said side rails and to permit the rearward movement of said vehicle body relative to said side rails so that said second body mount means compressively loads and deflects said side rails on impact of said front bumper to thereby absorb and store impact energy and so that said first body mount means compressively loads and deflects said side rails on rear impact of said rear bumper to thereby absorb and store energy.

5. The energy absorption system defined in claim 4, said first pair of openings being first elongated longitudinally extending slots adjacent to the front end of said side rails, said first rigid fastener means being secured to said vehicle body and extending through said first slots adjacent to the rear end thereof, said second pair of openings being elongated second slots longitudinally extending in the rear end of said side rails, said second rigid fastener means being secured to said vehicle body and extending through said second slots adjacent to the front end thereof to permit the compressive loading of said side rails by said body means in response to a front end impact of said first bumper means.

6. In an impact energy absorption system for vehicles comprising a vehicle body, a vehicle frame having longitudinally extending side rails operatively disposed beneath the vehicle body and adapted to act as buckling columns to absorb impact energy, horizontally extending bumper means disposed outwardly from said vehicle body and rigidly connected to one end of said side rails, first and second pairs of body mount means, said first pair of body mount means operatively connecting said one end of said vehicle body to said side rails to permit said vehicle body to move longitudinally relative to said side rails, said second pair of body mount means operatively connecting the other end of said vehicle body to said side rails, said second pair of body mount means having rigid fastener means connected to said body and extending through said side rails to anchor one end of said vehicle body to said side rails to prevent the longitudinal movement of said one end of the vehicle body relative to said frame and to compressively load said frame from one end thereof remote from said bumper means in response to impact of said bumper means so that said side rails will buckle and absorb impact energy.

* * * * *